United States Patent Office 3,586,697
Patented June 22, 1971

3,586,697
NOVEL N-(3,5-DICHLOROPHENYL) CYCLIC IMIDE DERIVATIVES
Toshiaki Ozaki, Toyonaka-shi, Akira Fujinami, Ashiya-shi, Fukashi Horiuchi, Takatsuki-shi, Sigeo Yamamoto, Toyonaka-shi, Katsuji Nodera, Nishinomiya-shi, and Tadashi Ooishi, Minoo-shi, Japan, assignors to Sumitomo Chemical Co., Ltd.
No Drawing. Filed Nov. 26, 1968, Ser. No. 779,278
Claims priority, application Japan, Dec. 1, 1967, 42/77,233
Int. Cl. C07d 27/10, 27/18
U.S. Cl. 260—326.5             3 Claims

ABSTRACT OF THE DISCLOSURE

A cyclic imide of the formula:

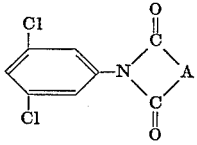

wherein A is —CH=CH— or —CH$_2$—CH$_2$—, i.e. N-(3,5-dichlorophenyl)maleimide or N-(3,5-dichlorophenyl)succinimide, which is prepared by reacting 3,5-dichloroaniline with maleic or succinic anhydride while heating at a temperature from 170 to 200° C., the cyclic imide being useful as an anti-microbial agent.

---

The present invention relates to novel N-(3,5-dichlorophenyl) cyclic imide derivatives, and their production and use.

The said N-(3,5-dichlorophenyl) cyclic imide derivatives [hereinafter referred to as "cyclic imide"] are representable by the formula:

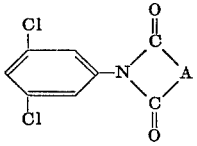

[I]

wherein A is —CH=CH— or —CH$_2$—CH$_2$— and include specifically N-(3,5-dichlorophenyl)maleimide [hereinafter referred to as "maleimide"] of the formula:

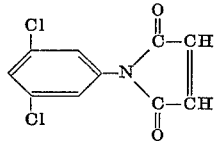

[Ia]

and N-(3,5-dichlorophenyl)succinimide [hereinafter referred to as "succinimide"] of the formula:

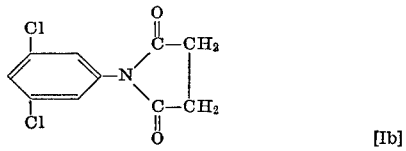

[Ib]

Hitherto, there have been provided a number of compounds having an N-phenylmaleimide or N-phenylsuccinimide structure. Some of them are known to possess antifungal activity against phyto-pathogenic fungi, but the activity is relatively weak. As the result of the study on various N-phenylmaleimide and N-phenylsuccinimide derivatives, it has now been found that the cyclic imides [I] show extremely high anti-microbial activity. It has also been found that their anti-microbial activity is exerted on a wide variety of phyto-pathogenic bacteria and fungi and/or parasites of industrial products. Such high and broad anti-microbial activity of the cyclic imides [I] is of unexpected and surprising property in view of no or slight activity of the chemical-structurally related compounds. Moreover, it is advantageous that the cyclic imides [I] produce no phytotoxicity in crop plants when applied in a practical amount which can exert control of diseases.

Accordingly, a basic object of the present invention is to embody the novel cyclic imides [I], i.e. the maleimide [Ia] and the succinimide [Ib]. Another object of this invention is to embody the cyclic imides [I] exerting anti-microbial activity against a wide variety of microbes. A further object of the invention is to embody an anti-microbial composition for agricultural use comprising as an active ingredient at least one of the cyclic imides [I]. A still further object of the invention is to embody a process for preparing the cyclic imides [I]. These and other objects will be apparent to those conversant with the art to which the present invention pertains from the subsequent descriptions.

According to the present invention, the cyclic imide [I] is prepared by reacting 3,5-dichloroaniline with maleic or succinic anhydride, usually while heating at a temperature from 170 to 200° C. No solvent is needed in the reaction.

Some examples of the procedures for the preparation of the cyclic imides [I] are shown below.

EXAMPLE 1

In a 50 ml.-volume flask, maleic anhydride (9.8 g.) and 3,5-dichloroaniline (16.2 g.) are charged, and the resulting mixture is heated at 180° C. for 15 minutes. The resultant product (24 g.) is crystallized from ethanol (50 ml.) to give N-(3,5-dichlorophenyl)maleimide (17 g.) as white crystals melting at 143 to 144° C.

EXAMPLE 2

In a 50 ml.-volume flask, succinic anhydride (10.0 g.) and 3,5-dichloroaniline (16.2 g.) are charged, and the resulting mixture is heated at 180° C. for 15 minutes. The resultant product (24 g.) is crystallized from ethanol (50 ml.) to give N-(3,5-dichlorophenyl)succinimide (16 g.) as white crystals melting at 137.5 to 139° C.

As stated above, the thus obtained cyclic imides [I] exhibit anti-microbial activity against a wide variety of pathogenic bacteria and fungi such as *Piricularia oryzae, Cochliobolus miyabeanus, Pellicularia sasakii, Sphaerotheca fuliginea, Botrytis cinerea, Alternaria kikuchiana, Alternaria mali, Glomerella cingulata, Pythium aphanidermatum, Pellicularia filamentosa,* Fusarium genus, *Corticium rolfsii, Sclerotinia sclerotiourm, Aspergillus niger* and *Xanthomonas oryzae.* Some of the test results from which such activity is confirmed are shown below.

Test 1

A test compound in dust form was applied to rice plants grown up to three leaf stage in pots of 9 cm. in diameter at a dose of 100 mg. of the test compound per pot. The application was made by the use of a duster. After one day, a spore suspension of *Piricularia oryzae* was sprayed to inoculate on the plants. The number of diseased spots was calculated 5 days thereafter. The results are shown in Table 1.

TABLE 1

| Test compound | Concentration, percent | Number of diseased spots per 10 leaves |
|---|---|---|
| N-(3,5-dichlorophenyl)-succinimide | 3.0 | 0 |
| N-(3,5-dichlorophenyl)-maleimide | 3.0 | 0 |
| N-phenylmaleimide | 3.0 | 108 |
| N-(2,4-dichlorophenyl)-succinimide | 3.0 | 65 |
| Phenylmercuric acetate | 0.29 | 3 |
| None (untreated) | | 117 |

Test 2

A test compound in wettable powder form was diluted with water and applied to rice plants grown up to four leaf stage in pots of 9 cm. in diameter at a dose of 7 ml. of the dilution per pot. After one day, a spore suspension of *Cochliobolus miyabeanus* was sprayed to inoculate on the plants. The number of diseased spots was calculated 4 days thereafter. The results are shown in Table 2.

TABLE 2

| Test compound | Concentration, p.p.m. | Number of diseased spots per leaf |
|---|---|---|
| N-(3,5-dichlorophenyl)-succinimide | 500 | 0.8 |
| N-(3,5-dichlorophenyl)-maleimide | 500 | 0 |
| N-phenylmaleimide | 500 | 12.5 |
| None (untreated) | | 19.4 |

Test 3

A test compound in emulsion form was diluted with water and applied to rice plants grown up to 60 cm. tall in beakers of 300 ml. in volume at a dose of 10 ml. of the dilution per pot. After one day, a mycelium-disc-inoculum (5 mm. in diameter) was inoculated on the sheath. The number of infected sheath was calculated 5 days thereafter. The results are shown in Table 3.

TABLE 3

| Test compound | Concentration, p.p.m. | Percent of infected sheath |
|---|---|---|
| N-(3,5-dichlorophenyl)-succinimide | 1,000 | 0 |
| N-(3-5-dichlorophenyl)-maleimide | 1,000 | 0 |
| N-(2,6-dichlorophenyl)-succinimide | 1,000 | 56.2 |
| Chloromethanesulfone-3,5-dichloroanilide | 1,000 | 37.7 |
| None (untreated) | | 100 |

Test 4

Healthy fruits of strawberry at the primary stage of ripeness were taken. Every 7 fruits were immersed in an aqueous dilution of a test compound in wettable powder form for 10 minutes and then dried in air. The fruits were placed in petri-dishes and maintained in a damp state. A spore suspension of *Botrytis cinerea* was sprayed to inoculate on the fruits, and the fruits were kept at 18° C. After 10 days at which time the production of numerous spores was seen in the untreated fruits, observation was made on the state of infection. The results are shown in Table 4 wherein the degree of damage is calculated by the following equation:

Degree of damage
$$= \frac{\Sigma(\text{Infection index} \times \text{number of fruits})}{\text{Total number of tested fruits} \times 3} \times 100$$

in which the infection index is defined as follows:
Infection index:
- 0—No infectious spot or spore on the fruits.
- 1—Infectious area being less than 30%.
- 2—Infectious area being from 30 to 80%.
- 3—Infectious area being more than 80%.

TABLE 4

| Test compound | Concentration, p.p.m. | Percent of infectious fruits | Degree of damage |
|---|---|---|---|
| N-(3,5-dichlorophenyl)succinimide | 100 | 14.3 | 4.8 |
| N-(3,5-dichlorophenyl)maleimide | 100 | 28.6 | 9.5 |
| N-phenylmaleimide | 100 | 100.0 | 100.0 |
| N-(2,6-dichlorophenyl)succinimide | 100 | 100.0 | 96.8 |
| Chloromethanesulfone-3,5-dichloroanilide | 100 | 85.7 | 81.0 |
| 2,4-dichloro-6-(2-chloroanilino)-S-triazine | 1,000 | 190.0 | 95.2 |
| None (untreated) | | 100.0 | 100.0 |

Test 5

A test compound in wettable powder form was diluted with water and applied to pumpkin seedlings grown up to three to four leaf stage in pots of 12 cm. in diameter at a dose of 7 ml. of the dilution per pot. After one day, a spore suspension of *Sphaerotheca fuliginea* was sprayed to inoculate on the seedlings. The infectious state was observed on the upper four leaves 10 days thereafter, and the state of damage was classified into 6 classes from index 0 (none of disease spot or colony observed on the leaves) to index 5 (disease spots or colonies observed all over the leaves). The results are shown in Table 5 wherein the degree of damage is calculated by the following equation:

Degree of damage
$$= \frac{\Sigma(\text{infection index} \times \text{number of leaves})}{\text{Total number leaves observed} \times 5} \times 100$$

TABLE 5

| Test compound | Concentration, p.p.m. | Degree of damage |
|---|---|---|
| N-(3,5-dichlorophenyl)-succinimide | 1,000 | 0 |
| | 500 | 2.6 |
| N-(3,5-dichlorophenyl)-maleimide | 1,000 | 0 |
| | 500 | 3.5 |
| N-phenylmaleimide | 1,000 | 46.0 |
| | 500 | 54.7 |
| N-(2,4-dichlorophenyl)-succinimide | 1,000 | 33.9 |
| | 500 | 42.5 |
| Chloromethanesulfone-3,5-dichloroanilide | 1,000 | 21.3 |
| | 500 | 34.1 |
| Hydrate sulfur | 2,500 | 3.2 |
| None (untreated) | | 53.1 |

Test 6

N-(3,5-dichlorophenyl)maleimide and N-(3,5-dichlorophenyl)succinimide were tested for their microbicidal effects on various microorganisms which cause serious damage to plants and industrial products, according to the agar dilution method. A solution of N-(3,5-dichlorophenyl)maleimide or N-(3,5-dichlorophenyl)succinimide diluted with dioxane was mixed with a warm sterilized potato agar medium in a ratio of 1 ml. of the solution per 10 ml. of the agar medium. The mixture was poured into each petri-dish and allowed to solidify. Then, the suspension of the microorganism was inoculated on each medium. The concentration of the test compound in the agar medium was 1,000, 200, 40 or 8 p.p.m. The results are shown in Table 6 in term of the inhibitory concentration of the test compound.

TABLE 6

| Test organism | Minimum inhibitory concentration against growth of test organism at the 5th day after inoculation (p.p.m.) | |
|---|---|---|
| | N-(3,5-dichloro-phenyl) male-imide | N-(3,5-dichloro-phenyl) succin-imide |
| Piricularia oryzae | 200 | |
| Cochliobolus miyabeanus | 200 | 200 |
| Alternaria kikuchiana | 200 | 8 |
| Alternaria mali | | 40 |
| Pythium aphanidermatum | 40 | |
| Pellicularia sasakii | | 8 |
| Pellicularia filamentosa | 8 | 40 |
| Helminthosporium sigmoidium | | 200 |
| Fusarium oxysporum f. niveum | | 200 |
| Corticium rolfsii | 200 | 200 |
| Botrytis cinerea | 200 | 8 |
| Glomerella cingulata | 200 | |
| Xanthomonas oryzae | 200 | |
| Aspergillus niger | 200 | |
| Sclerotinia sclerotiorum | | 8 |

As shown above, the anti-microbial activity of the cyclic imides [I] against various microbes is much higher than that of the chemical-structurally related compounds. Accordingly, they are useful for control of such plant diseases caused by phyto-pathogenic fungi and germs as rice blast, rice leaf spot, rice sheath blight, powdery mildew, bacterial leaf blight, gray mold of strawberry, anthracnose, black spot of pear and the like, and also for reduction of damage caused by *Aspergillus niger*. Otherwise stated, they are used as active ingredients in germicidal compositions for agricultural use.

According to the present invention, microbicidal compositions, such as dusts, wettable powders, emulsifiable concentrates and granules, are contemplated which comprises at least one of the cyclic imides [I], i.e. either or both of the maleimide [Ia] and the succinimide [Ib], in association with or without one or more solid or liquid diluents of the types commonly used in microbicidal compositions. Besides the cyclic imides [I], these microbicidal compositions may contain one or more known fungicides (e.g. Blasticidin S, Kasugamycin, Polyoxyin, Cellocidin, Chloramphenicol, O,O-diethyl-S-benzylphosphorothiolate,
O-ethyl-S,S-diphenylphosphorodithiolate,
O-n-butyl-S-ethyl-S-benzylphosphorodithiolate,
O,O-diisopropyl-S-benzylphosphorothiolate,
O-ethyl-S-benzylphenylthiophosphonate,
pentachlorobenzaldoxime,
pentachlorobenzyl alcohol,
pentachloromandelonitrile,
pentachlorophenyl acetate,
iron methylarsonate,
ferric ammonium methyl arsonate,
γ-1,2,3,4,5,6-hexachlorocyclohexane,
1,1,1-trichloro-2,2-bis(p-chlorophenyl)ethane,
O,O-dimethyl-O-(p-nitrophenyl) phosphorothioate,
S-[1,2-bis(ethoxycarbonyl)ethyl] O,O-dimethyl phosphorodithioate,
O,O-dimethyl S-(N-methylcarbamoylmethyl) phosphorodithioate,
O-ethyl O-p-nitrophenyl phenylphosphonothiorate,
α-naphthyl N-methyl carbamate,
O,O-dimethyl-O-(p-nitro-m-methylphenyl) phosphorothioate
3,4,5,6-tetrahydrophthalimidemethyl chrysanthemate,
3,4-dimethyl phenyl N-methylcarbamate,
O,O - diethyl O-(2-isopropyl-6-methyl-4-pyrimidinyl)thiophosphate,
O,O-dimethyl-2,2-dichlorovinyl phosphate,
1,1-bis(p-chlorophenyl)-2,2,2-trichloroethanol,
1,2-dibromoethane,
1,2-dibromo-3-chloropropane,
zinc ethylene bis(dithiocarbamate),
manganese ethylene bis(dithiocarbamate),
2,3-dichloro-1,4-naphthoquinone, N-(trichloromethylthio)-4-cyclohexene-1,2-dicarboximide,
N-(1,1,2,2-tetrachloroethylthio)-4-cyclohexene-1,2-dicarboximide,
6-methyl-2,3-quinoxaline dithiol cyclic carbonate,
tetrachloroisophthalonitrile,
sodium p-dimethylaminobenzenediazosulfonate,
2,4-dichloro-6-(2-chloroanilino)-s-triazine,
2,4-dichlorophenoxyacetic acid,
4-chloro-2-methylphenoxyacetic acid,
3,4-dichloropropionanilide,
2,4-dichlorophenyl-4'-nitrophenyl ether,
2-chloro-4,6-bis(ethylamino)-s-triazine,
sodium N-(1-naphthyl)phthalamate, etc.).

These microbicidal compositions may also contain one or more materials known to be active as insecticides, nematocides, acaricides, herbicides, fertilizers, soil conditioners, soil disinfectants or plant growth regulators. Examples of typical microbicidal compositions according to this invention are:

(a) Dusts obtained by dispersing at least one of the cyclic imides [I] as the active ingredient in a concentration of 0.1 to 30% by weight in an inert carrier (e.g. talc, diatomaceous earth, wood flour, clay).

(b) Wettable powders obtained by dispersing at least one of the cyclic imides [I] as the active ingredient in a concentration of 0.1 to 80% by weight in an inert adsorbent carrier (e.g. diatomaceous earth) together with a wetting and/or dispersing agent such as an alkali metal salt of a long aliphatic sulfate chain, a partly neutralized sulfuric acid derivative of either a petroleum oil or a natural occurring glyceride or a condensation product of an alkylene oxide with an organic acid.

(c) Emulsifiable concentrates obtained by dispersing at least one of the cyclic imides [I] as the active ingredient in a concentration of 0.1 to 50% by weight in an organic solvent (e.g. dimethylsulfoxide) plus an emulsifier such as an alkali metal salt of a long aliphatic sulfate chain, a partly neutralized sulfuric acid derivative of either a petroleum oil or a natural occurring glyceride or a condensation product of an alkylene oxide with an organic acid.

(d) Compositions of the cyclic imides [I] formulated in the manner commonly employed in the art for the preparation of microbicidal granules, dusts and aerosols.

More specific examples of the microbicidal compositions of this invention are shown below.

Example A.—N-(3,5-dichlorophenyl)succinimide (3 parts by weight) and clay (97 parts by weight) are crushed and mixed well to form a dust containing 3% by weight of the active ingredient. The dust is applicable as such.

Example B.—N-(3,5-dichlorophenyl)maleimide (50 parts by weight), an alkylbenzenesulfonate (5 parts by weight) as a wetting agent and diatomaceous earth (45 parts by weight) are crushed and mixed well to form a wettable powder containing 50% by weight of the active ingredient. The wettable powder is diluted with water and then applied.

Example C.—N-(3,5 - dichlorophenyl)maleimide (5 parts by weight), a polyoxyethylenealkyl phenol ether (5 parts by weight) as an emulsifier and dimethylsulfoxide (90 parts by weight) are mixed together to obtain an emulsifiable concentrate containing 5% by weight of the active ingredient. The emulsifiable concentrate is diluted with water and then applied.

Example D.—N-(3,5-dichlorophenyl)succinimide (2 parts by weight), O-n-butyl-S-ethyl-S-benzylphosphorodithiolate (2 parts by weight) and clay (96 parts by weight) are crushed and mixed well to form a dust containing 4% by weight of the active ingredients. The dust is applicable as such.

Example E.—N-(3,5 - dichlorophenyl)maleimide (2 parts by weight), pentachlorobenzaldoxime (3 parts by weight) and clay (95 parts by weight) are crushed and mixed well to form a dust containing 5% by weight of the active ingredients. The dust is applicable as such.

Minor modifications may be made in carrying out the present invention without departing from the spirit and scope thereof.

What is claimed is:
1. A cyclic imide of the formula:

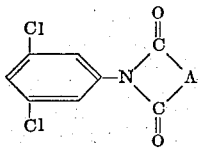

wherein A is —CH=CH— or —CH$_2$—CH$_2$—.

2. The cyclic imide according to claim 1 wherein A is —CH=CH.

3. The cyclic imide according to claim 1 wherein A is —CH$_2$—CH$_2$.

References Cited

UNITED STATES PATENTS 3,394,145   7/1968   Bublitz ---------- 260—326.5

OTHER REFERENCES

Chem. Abs., vol. 60: 9157 (1964), abs. of Belgium Pat. No. 623,333.

ALEX MAZEL, Primary Examiner

J. A. NARCAVAGE, Assistant Examiner

U.S. Cl. X.R.

424—274